(12) United States Patent
Römer

(10) Patent No.: US 10,857,911 B2
(45) Date of Patent: Dec. 8, 2020

(54) DEVICE AND METHOD FOR ADJUSTING A SEAT

(71) Applicant: Faurecia Autositze GmbH, Stadthagen (DE)

(72) Inventor: Bernd Römer, Stadthagen (DE)

(73) Assignee: Faurecia Autositze GmbH, Stadthagen (DE)

( * ) Notice: Subject to any disclaimer, the term of this patent is extended or adjusted under 35 U.S.C. 154(b) by 50 days.

(21) Appl. No.: 16/056,066

(22) Filed: Aug. 6, 2018

(65) Prior Publication Data

US 2019/0039481 A1    Feb. 7, 2019

(30) Foreign Application Priority Data

Aug. 7, 2017    (DE) .................. 10 2017 117 846

(51) Int. Cl.
| | |
|---|---|
| *B60N 2/80* | (2018.01) |
| *B60N 2/02* | (2006.01) |
| *B60N 2/809* | (2018.01) |
| *B60N 2/75* | (2018.01) |
| *B60N 2/821* | (2018.01) |
| *B60N 2/829* | (2018.01) |

(52) U.S. Cl.
CPC ............. *B60N 2/0284* (2013.01); *B60N 2/77* (2018.02); *B60N 2/809* (2018.02); *B60N 2/821* (2018.02); *B60N 2/829* (2018.02); *B60N 2002/0212* (2013.01)

(58) Field of Classification Search
CPC ........ B60N 2/809; B60N 2/821; B60N 2/826; B60N 2/829; B60N 2/77; B60N 2/0284

USPC .............. 297/383, 410, 411.36, 284.8, 284.7
See application file for complete search history.

(56) References Cited

U.S. PATENT DOCUMENTS

| | | | | |
|---|---|---|---|---|
| 1,264,265 | A * | 4/1918 | Brusius .................... | A47C 7/46 297/284.7 |
| 4,852,940 | A * | 8/1989 | Kanigowski ............. | A47B 5/00 297/145 |
| 5,393,124 | A * | 2/1995 | Neil ......................... | A47C 1/03 297/116 |
| 5,647,638 | A * | 7/1997 | Ritt .......................... | A47C 1/03 297/411.36 |
| 5,752,739 | A * | 5/1998 | Saeki ....................... | B60N 2/757 297/113 |
| 6,062,649 | A * | 5/2000 | Nagel ...................... | A47C 1/023 297/284.7 |
| 6,079,785 | A * | 6/2000 | Peterson ................. | A47C 7/462 297/284.5 |
| 6,126,238 | A * | 10/2000 | Klindworth ............ | B60N 2/809 297/410 |
| 6,203,109 | B1 * | 3/2001 | Bergsten ............ | A47B 21/0371 297/411.35 |
| 6,224,158 | B1 * | 5/2001 | Hann ...................... | B60N 2/809 297/391 |

(Continued)

*Primary Examiner* — Syed A Islam
(74) *Attorney, Agent, or Firm* — Henry M. Feiereisen LLC

(57) ABSTRACT

An adjustable motor vehicle seat includes a main part, an attachment which is movable relative to the main part, and a guide element which includes a receiving portion configured for receiving the main part or the attachment at least in part and having a surface which has at least one portion shaped spherically. The guide element is mounted in a bearing point of at least one of the main part and of the attachment, said bearing point having a cross section which at least in one portion is circular.

24 Claims, 6 Drawing Sheets

(56) References Cited

U.S. PATENT DOCUMENTS

| | | | | |
|---|---|---|---|---|
| 6,354,662 B1* | 3/2002 | Su | ............................ | A47C 7/46 |
| | | | | 297/284.4 |
| 6,575,530 B1* | 6/2003 | Fischer | .................. | A47C 7/282 |
| | | | | 297/284.1 |
| 6,976,739 B2* | 12/2005 | Wang | ........................ | A47C 1/03 |
| | | | | 297/411.2 |
| 7,097,247 B2* | 8/2006 | Battey | ................ | A47C 1/03255 |
| | | | | 297/284.4 |
| 7,303,232 B1* | 12/2007 | Chen | ........................ | A47C 7/38 |
| | | | | 297/284.7 |
| 7,344,194 B2* | 3/2008 | Maier | ........................ | A47C 7/46 |
| | | | | 297/284.4 |
| 8,562,072 B2* | 10/2013 | Ishimoto | ............... | B60N 2/4228 |
| | | | | 297/216.12 |
| 8,814,271 B2* | 8/2014 | Ishimoto | ................ | B60N 2/838 |
| | | | | 297/408 |
| 8,876,211 B2* | 11/2014 | Tscherbner | ............... | A47C 7/38 |
| | | | | 297/410 |
| 8,926,020 B2* | 1/2015 | Jeong, II | ................ | B60N 2/888 |
| | | | | 297/408 |
| 9,572,741 B2* | 2/2017 | Weaver | .................. | A61F 5/3723 |
| 2002/0093231 A1* | 7/2002 | Estrada | .................. | B60N 2/829 |
| | | | | 297/216.12 |
| 2007/0228797 A1* | 10/2007 | Wang | ........................ | A47C 1/03 |
| | | | | 297/410 |
| 2014/0312668 A1* | 10/2014 | Hurford | ............. | A47C 1/03261 |
| | | | | 297/284.7 |
| 2015/0015049 A1* | 1/2015 | Mueller | .................. | B60N 2/829 |
| | | | | 297/410 |

\* cited by examiner

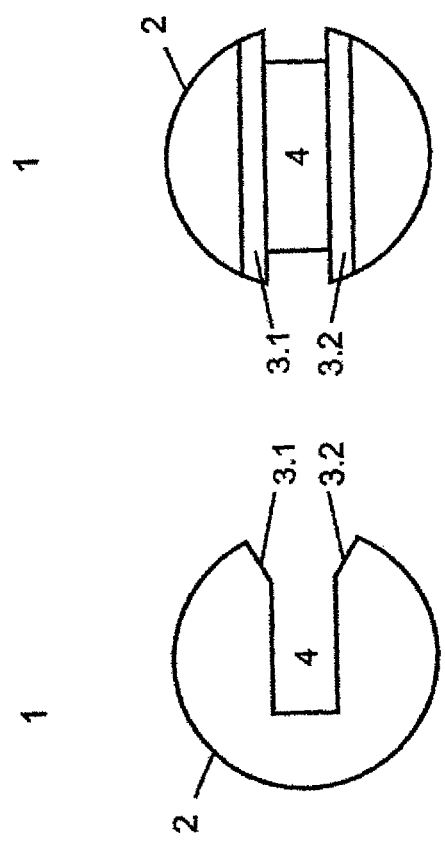

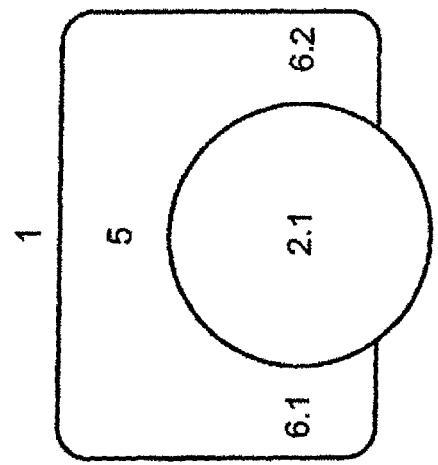
Fig. 2c
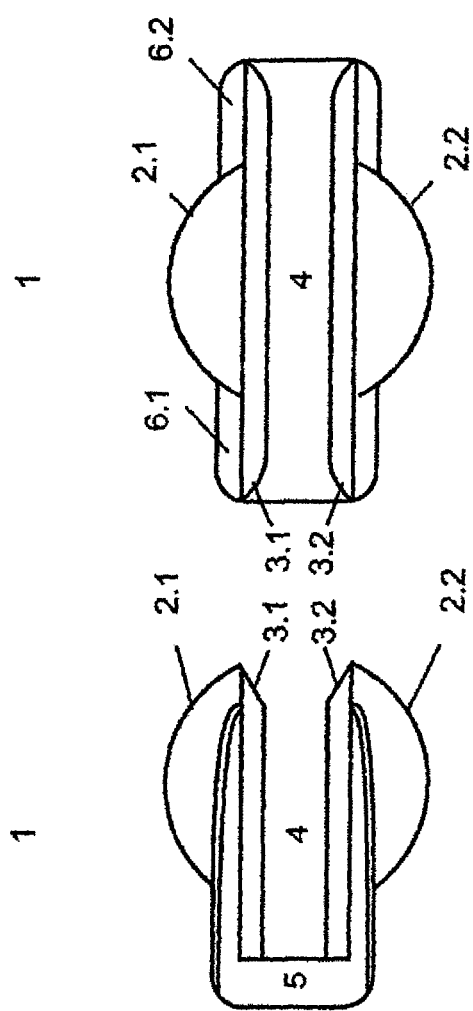
Fig. 2b
Fig. 2a

DEVICE AND METHOD FOR ADJUSTING A SEAT

CROSS-REFERENCES TO RELATED APPLICATIONS

This application claims the priority of German Patent Application, Serial No. 10 2017 117 846.5, filed Aug. 7, 2017, pursuant to 35 U.S.C. 119(a)-(d), the disclosure of which is incorporated herein by reference in its entirety as if fully set forth herein.

BACKGROUND OF THE INVENTION

The present invention relates to an adjustable motor vehicle seat.

The following discussion of related art is provided to assist the reader in understanding the advantages of the invention, and is not to be construed as an admission that this related art is prior art to this invention.

Many modern motor vehicle seats for motor vehicles are provided with components by means of which at least one part of the seat can be adjusted individually for the person sitting therein. Examples of adjustable parts of this kind are adjustable lumbar supports, adjustable side and back supports, or massage functions. Seats that provide a user with the possibility of adjusting at least one part of the seat are used in modern motor vehicles in order to offer the user improved comfort. This may be particularly important when the user is in the seat for a long period of time. An example is a seat for passenger transport, for example a car, bus or aircraft seat. In order to accommodate different sizes of passengers, it is expedient to use a seat, in the vehicles mentioned, that makes it possible to adjust the size of the seat cushion. This can be achieved by raising the seat surface and/or reducing the length (depth) of a seat cushion. In this case, it is possible to adjust the depth of the seat cushion on which the users' upper legs rest.

The adjustment may be manually operated or motor-driven. Motor-driven adjustment devices increase user-friendliness. The user can easily actuate the motor-driven adjustment device by means of a controller. The seat can also automatically assume a pre-set position.

In general, a seat-depth adjustment includes a carriage on which the seat surface is mounted, and the seat frame, which establishes the connection to the remainder of the seat. The carriage and seat frame have common guides, by means of which the carriage and seat frame are displaced against one another. Owing to manufacturing tolerances, the fundamental difficulty associated with parts that are movable towards one another, and due to deformations triggered by external forces (e.g. weight and movement of the user), degrees of freedom (play) result about the vertical axis (yawing), the longitudinal axis (rolling) and the transverse axis (pitching). One approach to address the adverse affect of these degrees of freedom involves the use of a guide that includes resilient bends. These bends generate however high friction forces between carriage and guide.

It would therefore be desirable and advantageous to provide an improved adjustable motor vehicle seat which obviates prior art shortcomings and minimizes play between attachment and main part, and which can be manufactured in a simple and cost-effective manner, while reducing a drive force of the adjustment.

SUMMARY OF THE INVENTION

An adjustable motor vehicle seat according to the invention for adjusting an attachment relative to a main part of a motor vehicle seat is designed such that play is prevented about the three movement axes of the movable attachment by means of a corresponding arrangement and geometrical design of the guide elements. Moreover, friction forces are so greatly reduced that a significantly smaller application of force is sufficient for adjusting the attachment.

According to one aspect of the present invention, a motor vehicle seat with an adjustment for movable attachments includes a main part and an attachment. The attachment is used to uncouple a part of the seat from the remaining part of the seat and move it relative to the main part. The part that can be adjusted by the user into a different position, for example in order to achieve a more comfortable seat position, is mounted on the attachment. The main part is connected to the remainder of the motor vehicle seat. The attachment can be displaced relative to the main part in one direction by means of at least one guide element. The guide element comprises a receiving portion that is designed so as to be able to receive the main part and/or the attachment in part. The guide element is mounted in a bearing point of the main part and/or of the attachment and thus allows a relative movement between the attachment and the main part. It is irrelevant for this relative movement whether the guide element is mounted in the main part and receives the attachment in the receiving portion in part, or is mounted in the attachment and receives the main part in the receiving portion in part. The guide element and the bearing point of the attachment or main part have a cross section that is circular at least in part. While the surface of the guide element is convexly curved, the surface of the bearing point is concavely curved. A substantially globular or spherical guide element significantly reduces the friction forces between the guide element and the bearing point compared with solutions known hitherto, and an adjustable motor vehicle seat according to the invention requires a comparatively smaller application of force.

Adjustments of this type are conceivable for a very wide range of applications and can be used, for example, for the following adjustments:

- guide for a height-adjustable headrest (attachment) relative to the backrest (main part), the front part (attachment) of a length-adjustable headrest (main part), or side parts (attachment; for sleeping) that can be extended from the headrest (main part)
- guide for an armrest (attachment) relative to a motor vehicle seat (main part), or a part (attachment, e.g. the padded part) of an armrest (main part) for releasing a stowage space, or a guide for extending an actuation means (attachment; e.g. touchscreen) or a cup holder (attachment) from the armrest (main part)
- guide for a multimedia device (attachment; e.g. a monitor (attachment) that can be extended out of the backrest (main part) or the headrest (main part))
- guide for a retractable footrest (attachment) from a motor vehicle seat (main part)

In an advantageous embodiment of the invention, the motor vehicle seat can include a motor-driven adjustment mechanism to implement a relative movement between the attachment and the main part. A motor-driven adjustment mechanism is advantageous over a manual adjustment. The comfort for the user is increased. Moreover, the user can automatically move the motor vehicle seat into the position most comfortable for him by means of an interface. Depending on the embodiment, further parts of the motor vehicle seat can additionally be adjusted using the motor-driven adjustment.

According to a further advantageous feature of the present invention, the motor-driven adjustment mechanism can include a spindle drive. The spindle can be flexible and is also not susceptible to forces transverse to the spindle. A spindle drive thus operates reliably even under aggravated conditions.

According to a further advantageous feature of the present invention, the guide element can be rotatably mounted in the main part and/or the attachment. Rotatable mounting reduces the play between the guide element and the bearing thereof, with respect to forces both in the longitudinal direction and in the transverse direction. This is achieved in that the rotation makes it possible to better compensate for deformations of the component that is received in the receiving portion of the guide element. Deformations of this kind may result from stress on the component or may be due to manufacturing tolerances.

According to a further advantageous feature of the present invention, the curvature of the cross section of the guide element can be the same as the curvature of the cross section of the bearing point, at least in portions. This geometry ensures that the play between the guide element and the bearing point is minimized and that transverse forces are compensated for at the same time. As a result, easy movement can be ensured even in the case of deformed attachment and/or main part components, without needing to increase the play between the components. This results in an improved perceived quality.

According to a further advantageous feature of the present invention, the adjustable motor vehicle seat can include a plurality of guide elements that are mounted in a bearing point of the main part and/or of the attachment. The guide elements prohibit rolling, yawing and pitching movements of the attachment relative to the main part.

The cross section of the guide element according to the invention for use in a motor vehicle is circular at least in portions. Such a shape of the guide element reduces the friction forces between the guide element and the bearing point, and the motor vehicle seat according to the invention comprising an adjustment means requires a smaller application of force. This arrangement allows a relative movement between the attachment and the main part. In this case it is irrelevant for this relative movement whether the guide element receives the attachment or the main part in the receiving portion in part.

According to a further advantageous feature of the present invention, the cross section of the guide element can be perpendicular to the movement direction of the attachment. This makes it possible for the guide element to perform a rotational movement when in a bearing point that likewise has a circular cross section. The advantage of this is that the deformation of an attachment and/or main part that has/have been manufactured in an irregular manner or deformed during use does not lead to impairment of the movement abilities of the attachment and/or main part, and the play can be as low as possible in spite thereof.

According to a further advantageous feature of the present invention, the guide element for use in a motor vehicle seat can include a receiving portion that is suitable for receiving the attachment and/or the main part of a motor vehicle seat in part. In an optional development of the invention, the receiving portion is formed in the shape of a groove, A part of the attachment and/or of the main part can be pushed into said groove with little effort. The weight of the attachment and/or of the main part ensures a lasting connection between the guide element and the attachment and/or the main part, and can be implemented simply and cost-effectively in pre-existing adjustments.

According to a further advantageous feature of the present invention, the guide element for use in a motor vehicle seat can be designed such that the depth of the groove is more than 50%, preferably more than 60%, and particularly preferably more than 75% of the width of the groove.

According to a further advantageous feature of the present invention, the flanks of the receiving portion can include surfaces that are angled such that the components to be received in the receiving portion can be more easily inserted into the receiving portion. This significantly facilitates assembly.

According to a further advantageous feature of the present invention, the guide element can include a side tab that lengthens the receiving portion in the direction of translation of the adjustment. This provides the components inserted into the receiving portion with better hold and additionally reduces the play.

According to a further advantageous feature of the present invention, the guide element can include a pocket that increases the depth of the receiving portion perpendicularly to the direction of translation of the adjustment. A component (attachment or main part) positioned in the receiving portion has one more degree of freedom of movement owing to the increased depth of the pocket. In addition, it is also possible to compensate for deformations or inaccuracies in assembly in this direction without problem, without the performance or the quality perceived by the use being impaired.

According to another aspect of the present invention, a method according to the invention for adjusting a motor vehicle seat is designed such that a relative movement of the attachment of the motor vehicle seat with respect to the main part is possible. The relative movement is made possible by guide elements that are mounted in bearing points. In this case, parts of the main part or of the attachment slide through the receiving portion. In this case, the guide elements are designed so as to be rotatable about an axis in parallel with the movement direction of the relative movement between the attachment of the motor vehicle seat and the main part during the relative movement. The guide elements absorb forces resulting from shifting of weight, e.g. resulting from movement of the user, and said forces are compensated for by means of this arrangement.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1*a* shows a schematic front view of a guide element according to the present invention having a spherical surface;

FIG. 1*b* shows a schematic side view of the guide element of FIG. 1*a*.

FIG. 2*a* shows a schematic front view of a guide element having a spherical surface, side limbs and a pocket;

FIG. 2*b* shows a schematic side view of the guide element of FIG. 2*a*;

FIG. 2*c* shows a schematic plan view of the guide element of FIG. 2*a*;

DETAILED DESCRIPTION OF PREFERRED EMBODIMENTS

Figure 3:
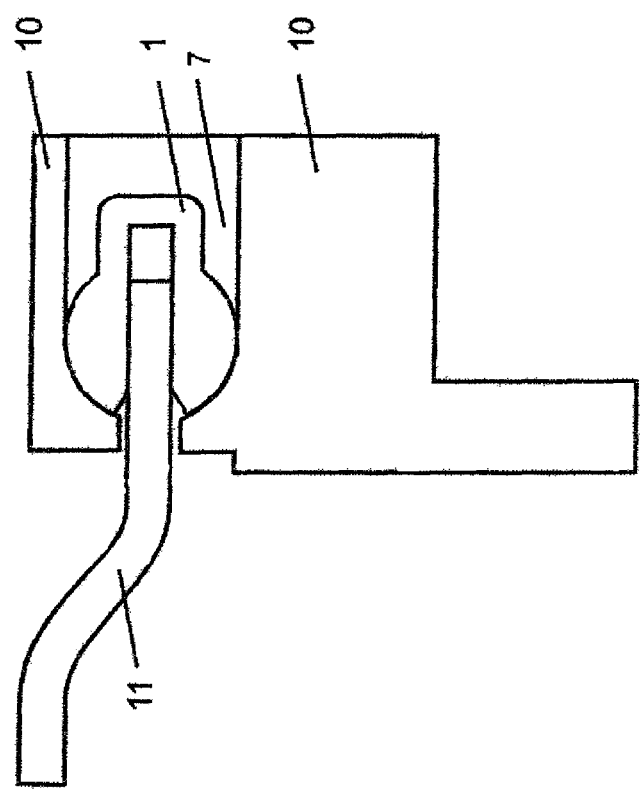
FIG. 3 shows a schematic illustration of a guide element mounted in a bearing point of a seat frame, having a component of a carriage in the receiving portion of the guide element.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIGS. 1a and b, there are shown front and side views of a guide element according to the present invention, generally designated by reference numeral 1. The guide element 1 has a curved surface 2 and, in this embodiment, is substantially spherical. This shape ensures that the guide element 1 can be mounted so as to be rotatable in all directions and minimizes the friction forces between the guide element 1 and the bearing point 7 of the guide element 1. The guide element 1 comprises a receiving portion 4. The receiving portion 4 is in the shape of a groove and comprises two angled surfaces 3.1, 3.2 that transition into the main body of the guide element 1. Elements or components of the seat frame 10 or of the carriage 11 can be inserted into the groove-like receiving portion 4.

FIGS. 2a-c show a further embodiment of the guide element 1. In comparison with the previous embodiment, the guide element 1 comprises side limbs 6.1, 6.2 that extend the length of the guide element 1 and thus provide the component with better adhesion in the groove-like receiving portion 4. Furthermore, the lengthened receiving portion reduces the play. Moreover, the pocket 5 increases the depth of the groove-like receiving portion 4.

FIG. 3 shows the guide element 1 in a seat-depth adjustment means. In this embodiment, the attachment according to the invention is the carriage of the seat-depth adjustment means, and the main part is the seat frame. The guide element 1 is mounted in a bearing point 7 in the seat frame 10 such that the guide element 1 is rotatable about the transverse axis thereof (in the direction of translation of the carriage). In this case, the bearing point 7 is designed such that the radius of the concavely curved surface 8.1, 8.2 thereof approximately matches the radius of the curved surface 2.1, 2.2 of the guide element, such that the guide element 1 has only a small amount of play. The guide element 1 receives the carriage 11 by means of the groove-like receiving portion 4 and thus allows a relative movement between the carriage 11 and the seat frame 10. The depth of the receiving portion 4 is greater than the depth to which the carriage 11 penetrates by default (i.e. according to the design plan). This means that manufacturing tolerances or deformations in this direction can also be compensated for without the mobility of the carriage 11 relative to the seat frame 10 being impaired and the carriage 11 and the seat frame 10 becoming wedged together. The movement direction of the relative movement between the seat frame 10 and the carriage 11 is perpendicular to the cross section of the guide element 1. It is also possible to mount the guide element 1 in the carriage 11. In this case, the groove 4 of the guide element 1 receives the seat frame 10.

Figure 4:
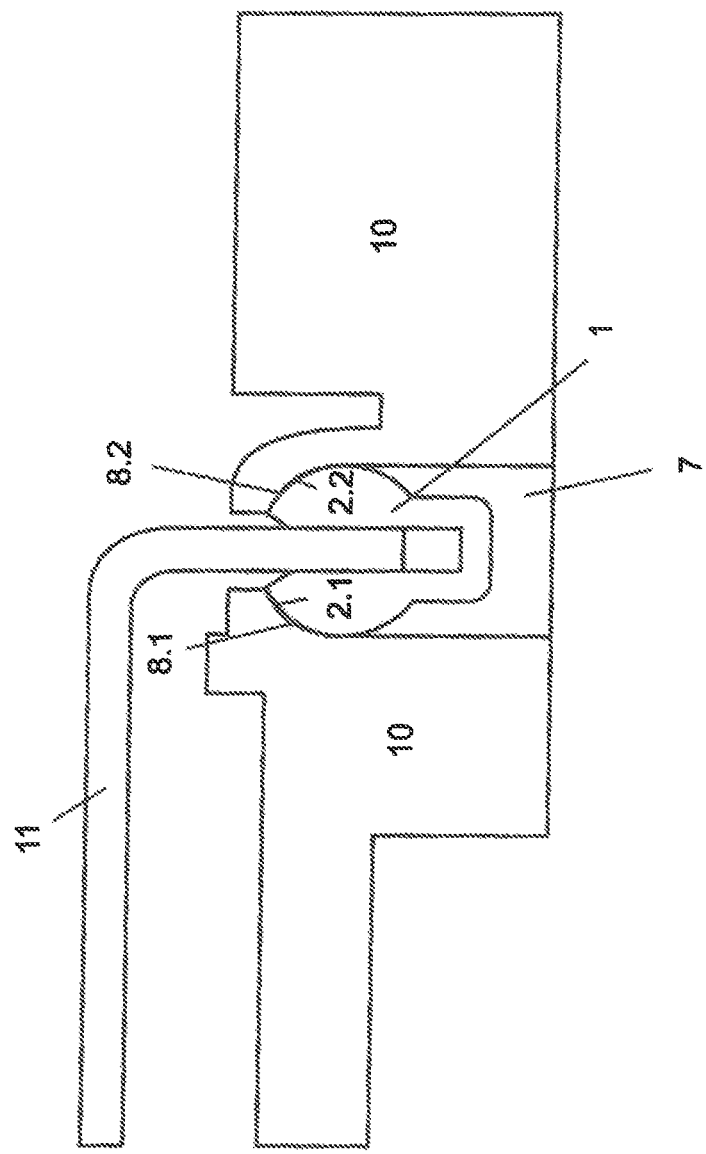
FIG. 4 shows a schematic illustration of a guide element mounted in a bearing point of a carriage, having a component of a seat frame in the receiving portion of the guide element.

FIG. 4 shows another arrangement of the guide element 1, again in a seat-depth adjustment means. In this case, the guide element 1 is installed such that the opening of the receiving portion 4 is oriented upwards. Said guide element is mounted in a bearing point 7 of the seat frame 10, The bearing point comprises concavely curved spherical surfaces 8.1, 8.2 that act as a sliding surface for the guide element 1. The guide element 1 comprises convexly curved spherical surfaces 2.1, 2.2 that correspond to the curved surfaces 8.1, 8.2 of the bearing point 7. The carriage 11 is designed so as to curve downwardly, substantially at a right-angle, at the end that is guided in the receiving portion 4 of the guide element 1. The receiving portion 4 of the guide element 1 is designed having an additional pocket 5 that lengthens the receiving portion 4 over the sphere cross section. In this case, the length of the groove-like receiving portion 4 is selected such that the carriage 11 does not rest on the end of the receiving portion 4 or pocket 5, but instead a small gap remains between the carriage 11 and the pocket 5. When the length of the carriage 11 changes due to stress, e.g. due to the weight of the user, this is compensated for in this way. Furthermore, the receiving portion 4 comprises angled surfaces 3.1, 3.2 on the upper edge thereof, which surfaces facilitate the insertion of the carriage 11 into the groove-like receiving portion 4. This arrangement can compensate for manufacturing tolerances and deformations owing to use and/or stress in the direction of the opening of the receiving portion 4, and due to rotation about an axis that is in parallel with the movement direction of the carriage 11, as well as perpendicular thereto.

Irregularities in the dimensions of the components may result during the manufacturing process, leading to significant play between the components that are to be moved relative to one another. Furthermore, during use of the motor vehicle seat, at least further elastic and sometimes also plastic deformation occurs. In order for the mobility of the carriage 11 relative to the seat frame 10 to still be ensured even in such cases, the components must be provided with some degree of mobility. However, this results in the quality perceived by the user suffering if the play is not compensated for by appropriate measures.

During the relative movement between the seat frame 10 and the carriage 11, an edge of the carriage slides through the groove-like receiving portion 4. Irregularities in the dimensions of the edge of the carriage 11 are compensated for by the depth of the groove-like receiving portion 4 of the guide element 1. Furthermore, the guide element 1 is rotatably mounted in the bearing point 7 such that irregularities in the angle of the angled region of the carriage 11 can also be compensated for by a corresponding rotational movement of the guide element 1 in the bearing point 7. A further rotational movement of the guide element 1 is compensated for about an axis perpendicular to the movement direction of the carriage 11.

Figure 5:
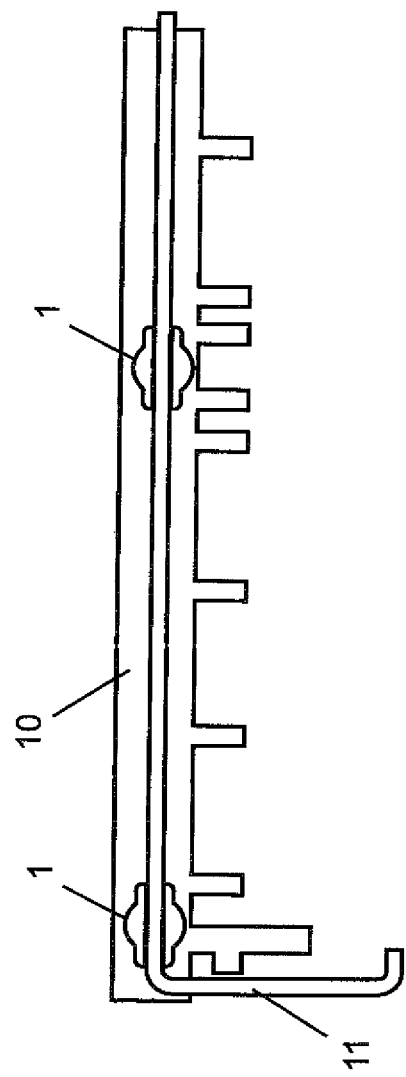
FIG. 5 shows a schematic illustration of an arrangement of two guide elements positioned one behind the other.

FIG. 5 shows an arrangement of a seat-depth adjustment in which, during the translational movement, the carriage 11 is guided, on one side of the carriage 11, by means of two guide elements 1 during the adjustment of the seat depth. The guide elements 1 are arranged one behind the other. The carriage 11 is pushed into the guide elements 1. This allows for a horizontal relative movement between the carriage 11 and the seat frame 10. This arrangement significantly minimizes the play between the carriage 11 and the seat frame 10. The ease of movement is maintained as a result of the possible rotational movement of the guide elements 1 about axes in parallel with and perpendicular to the movement direction, while the play, and therefore the quality perceived by the user, is still ensured.

Figure 6:
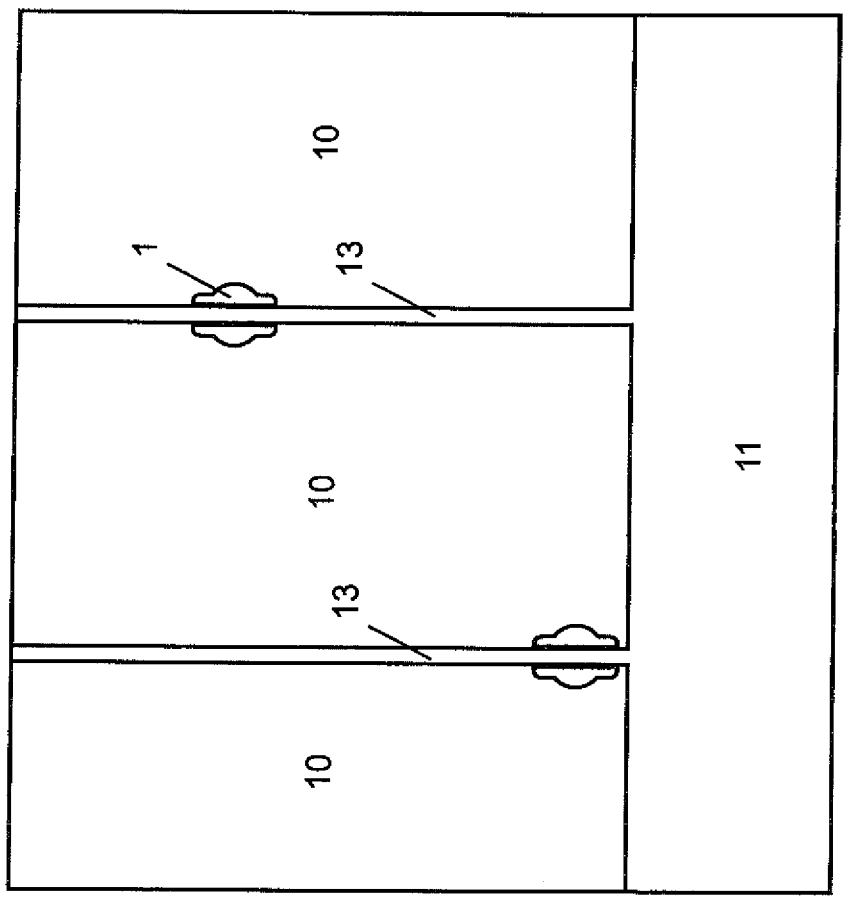
FIG. 6 shows a schematic illustration of an arrangement of two guide elements positioned side-by-side.

Another form of arrangement according to the invention in a seat-depth adjustment means is shown in FIG. 6. In order to prevent the yawing movements (rotation of the carriage 11 about the vertical axis) two guide elements 1 are arranged so as to be substantially diagonal. Yawing movements occur when the user moves back and forth in the motor vehicle seat for example or rotates on the carriage 11, as may be the case when getting in or out for example. The rotation produces a yawing movement of the carriage 1.1 relative to the seat frame 10 which may lead to the guide of the carriage 11 deflecting. The carriage 11 is therefore connected to the guide elements 1 by means of two guide rails 13 and can carry out a movement relative to the seat frame 13 and thus change the length of the seat surface. The lateral spacing of the guide elements 1 is selected so as to be as small as possible. In contrast, the spacing in the direction of translation is selected so as to be large. The lateral spacing is less than 80%, preferably less than 60%, and particularly preferably less than 40% of the width of the carriage 11. The yawing movements of the carriage 11 are smaller the smaller the lateral spacing between the guide elements 1.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An adjustable motor vehicle seat, comprising:
   a main part;
   an attachment movable relative to the main part; and
   a guide element including a receiving portion configured for receiving the main part or the attachment at least in part and having a surface which has at least one portion shaped spherically, said guide element being mounted in a bearing point of at least one of the main part and of the attachment, said bearing point having a cross section which at least in one portion is circular.

2. The motor vehicle seat of claim 1, further comprising a motorized adjustment mechanism to implement a relative movement between the attachment and the main part.

3. The motor vehicle seat of claim 2, wherein the motorized adjustment mechanism comprises a spindle drive.

4. The motor vehicle seat of claim 1, wherein the guide element is rotatably mounted in the at least one of the main part and the attachment.

5. The motor vehicle seat of claim 1, wherein the surface of the guide element has a convex curvature which matches a curvature of a surface of the bearing point in at least one portion, said curvature of the surface of the bearing point being concave.

6. The motor vehicle seat of claim 1, further comprising a plurality of said guide element, said guide elements being mounted in bearing points of at least one of the main part and of the attachment.

7. A guide element for installation in a motor vehicle seat including a main part and an attachment movable relative to the main part; said guide element including a receiving portion configured for receiving the main part or an attachment at least in part, said guide element having a surface which has at least one portion shaped spherically, and being configured for support in a complementarily shaped bearing point of at least one of the main part and of the attachment.

8. The guide element of claim 7, wherein the guide element is rotatably mounted in the at least one of the main part and the attachment.

9. The guide element of claim 7, wherein the surface of the guide element has a convex curvature which matches a curvature of a surface of the bearing point in at least one portion, said curvature of the surface of the bearing point being concave.

10. The guide element of claim 7, wherein the guide element has a cross section which is perpendicular to a movement direction of the attachment in relation to the main part.

11. The guide element of claim 7, wherein the receiving portion has a shape of a groove.

12. The guide element of claim 7, wherein the groove has a depth which is more than 50%, preferably more than 60%, and particularly preferably more than 75% of a width of the groove.

13. The guide element of claim 7, wherein the receiving portion comprises an angled surface.

14. The guide element of claim 7, further comprising a &de limb configured to lengthen the receiving portion in a direction of translation of adjustment.

15. The guide element of claim 14, further comprising a pocket configured to increase a depth of the receiving portion perpendicularly to the direction of translation.

16. A method for adjusting a seat depth of a motor vehicle seat including a main part and an attachment movable relative to the main part, said method comprising:
   guiding a movement of the attachment relative to the main part via a guide element such that the guide element is rotatable about an axis which extends in parallel relation to a movement direction of the movement of the attachment relative to the main part;
   forming the guide element with a receiving portion for receiving the main part or the attachment at least in part; and
   forming a surface of the guide element such that at least one portion of the surface is shaped spherically for support in a complementarily shaped bearing point of at least one of the main part and of the attachment.

17. The method of claim 16, further comprising rotatably mounting the guide element in the at least one of the main part and the attachment.

18. The method of claim 16, wherein the surface of the guide element has a convex curvature which matches a curvature of a surface of the bearing point in at least one portion, said curvature of the surface of the bearing point being concave.

19. The method of claim 16, wherein the guide element has a cross section which is perpendicular to a movement direction of the attachment in relation to the main part.

20. The method of claim 16, wherein the receiving portion has a shape of a groove.

21. The method of claim 20, wherein the groove has a depth which is more than 50%, preferably more than 60%, and particularly preferably more than 75% of a width of the groove.

22. The method of claim 16, further comprising forming the receiving portion with an angled surface.

23. The method of claim 16, further comprising lengthening the receiving portion by a side limb in a direction of translation of adjustment.

24. The method of claim 23, further comprising forming a pocket in the guide element to increase a depth of the receiving portion perpendicularly to the direction of translation.

\* \* \* \* \*